UNITED STATES PATENT OFFICE.

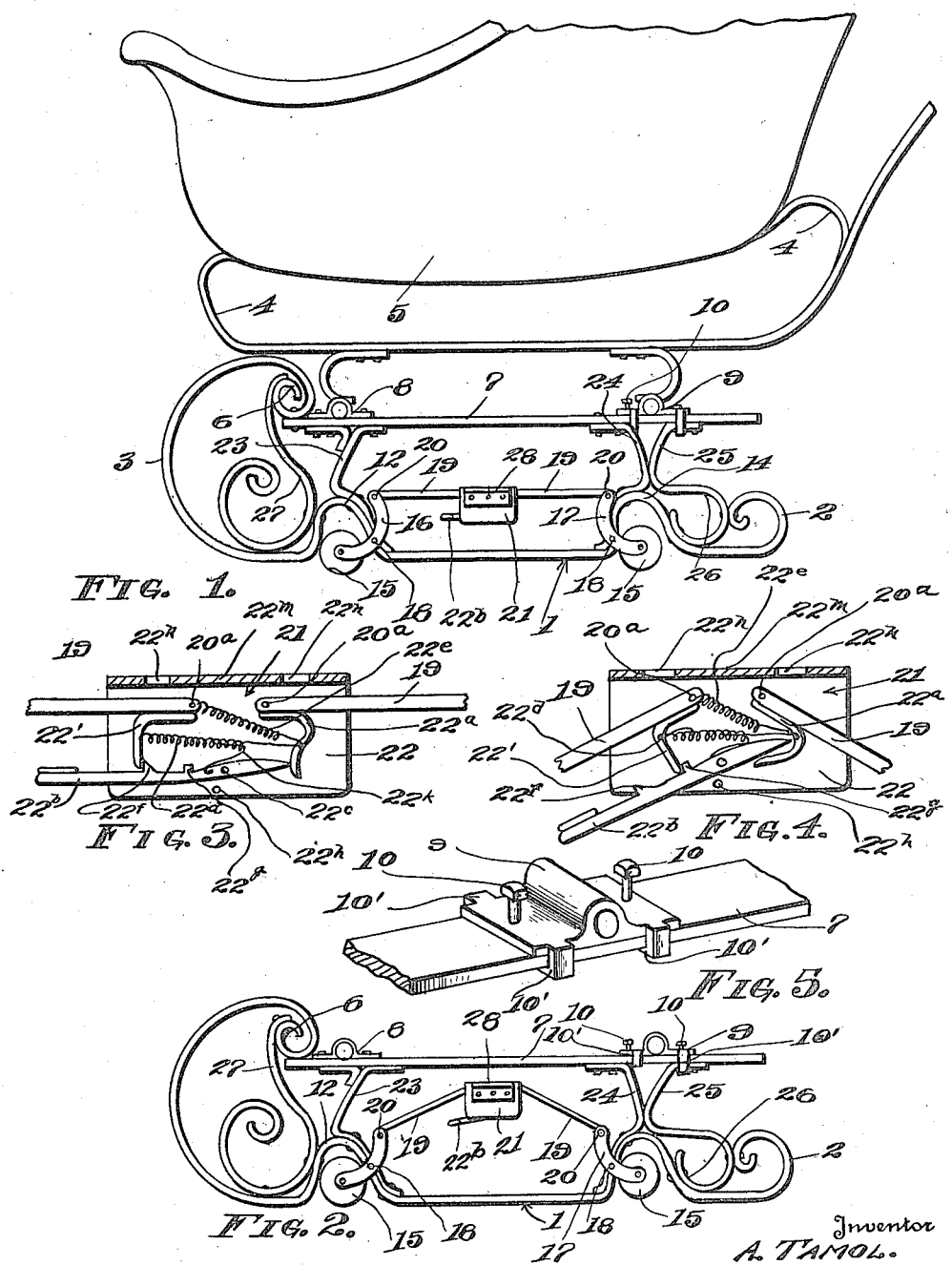

ADAM TAMOL, OF SLOAN, NEW YORK.

RUNNER FOR BABY-CARRIAGES.

1,260,476.

Specification of Letters Patent. Patented Mar. 26, 1918.

Application filed May 25, 1917. Serial No. 170,941.

*To all whom it may concern:*

Be it known that I, ADAM TAMOL, a citizen of the United States, residing at Sloan, in the county of Erie and State of New York, have invented certain new and useful Improvements in Runners for Baby-Carriages; and I do hereby declare the following to be a full, clear, and exact description of the invention, such as will enable others skilled in the art to which it appertains to make and use the same.

This invention relates to a runner structure adapted for use on baby carriages and the primary object of the invention is to provide a runner structure which has wheels carried thereby, so that the wheels may be moved into operative position, when the carriage is moved in a house, or over places in the sidewalks or street where there is no snow, and further to provide a pair of pivoted arcuate levers which carry the wheels, and have connecting rods connected thereto and to a lock structure through the medium of which lock structure the wheels are moved into operative positions, or allowed to move upwardly out of operative position so that the weight of the carriage will be borne by the runners in lieu of by the wheels.

Another object of this invention is to provide a runner structure as specified, which may be attached to any baby carriage by the adjusting of the position of one of the axle carrying boxes or bearings of the runner.

With the foregoing and other objects in view, this invention consists of such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the runner structure, showing a part of a baby carriage mounted thereon and illustrating the rollers or wheels in operative weight supporting position.

Fig. 2 is a side elevation of the latter structure showing the runners in position for supporting the weight of the carriage and the wheels in inoperative position.

Fig. 3 is a sectional view through the safety lock structure showing the wheel carrying arm in horizontal position at which time the wheels are in ground engaging position.

Fig. 4 is a view similar to Fig. 3, only showing the position of the locking structure when the wheels are out of a ground engaging position, and Fig. 5 is a detail perspective view illustrating the manner of adjustably connecting the bearing bracket to the runner structure.

Referring more particularly to the drawings, 1 designates the runner of the runner structure, which runner is constructed of bar iron, and has its rear end 2 curled, as clearly shown in Figs. 1 and 2 of the drawings, so as to provide a rounded rear end to the runner as well as add to the artistic appearance of the runner structure. The forward end 3 of the runner 1 is also curved upwardly and spirally curled at its terminal so as to provide a comparatively high rounded surface or front end to the runner. The highest part of the curved front end 3 of the runner is positioned a comparatively short distance beneath the springs as indicated at 4 of an ordinary baby carriage 5 and the curl or spiral 6 at the terminal of the front end 3 is attached in any suitable manner to the front end of the brace or supporting bar 7 of the runner structure. The brace or supporting bar 7 of the runner structure has a bearing box 8 carried by its upper surface at its forward end and a second bearing box 9 carried by its upper surface adjacent to its rear end. The bearing boxes 8 and 9 are provided for receiving the spindles of the axles of the baby carriage 5, for connecting the baby carriage to the runner structure.

The bearing box 9 is adjustably mounted upon the upper surface of the bracing bar 7, and it is held in various adjusted positions through the medium of set screws 10, which engage the upper surface of the bar 7 and force the cross bars 10' in firm engagement with the under surface of the bar 7. The cross bars 10' are formed upon the bearings 9 as clearly shown in Fig. 5 of the drawing. The adjustment of the bearing boxes 9 is provided for regulating the distance between the bearing boxes 8 and 9 to accommodate the distance between the axles of various types of baby carriages.

The runner 1 is provided with a forward indentation or upstanding portion 12 and a rear indentation or upstanding portion 14. The portions 12 and 14 are formed by bending portions of the runner 1 upwardly to form substantially inverted U-shaped portions in which are positioned the wheels or rollers 15 of the runner structure. The wheels or rollers 15 are comparatively small with respect to the usual type of baby carriage wheels and they are carried by the lower ends of arcuate levers 16 and 17 respectively. The levers 16 and 17 are pivotally connected as shown at 18 to the runner structure 1 and they have connecting rods 19 pivotally connected to their upper end as shown at 20. The connecting rods 19 extend toward each other, and have their inner ends connected to a safety lock structure 21. The safety lock structure 21 is provided for holding the rods 19 in horizontal positions, against accidental pivotal movement, for holding the wheels 15 in load supporting positions, as indicated in Fig. 1 of the drawings. When the rods 19 are positioned in horizontal planes, the rollers 15 will project beneath the under surface of the runner 1, as clearly shown in Fig. 1 of the drawings, so that the weight of the baby carriage 5 will be supported by the wheels and so that it may be readily and easily pushed over surfaces where there is no snow or ice, such as in a house, or over places on sidewalks or streets where the snow has been removed or melted.

The safety lock structure 21 comprises a casing 22, in which the upper end of the bars 19 are pivotally mounted as shown at 20$^a$. The bar 19, which is positioned to the front of the carriage, has an angled bar 22' carried thereby, one arm of which extends at right angles to the bar 19. The bar 19, which extends toward the rear of the cart, has an arm 22$^a$ connected thereto which is curved, as clearly shown in Figs. 3 and 4 of the drawings so as to provide a guide for the inner end of the pivotally mounted lever 22$^b$. The lever 22$^b$ is pivotally mounted upon a pin 22$^c$ and it projects out of the casing 22. A coiled spring 22$^d$ is connected to the arms 22' and 22$^a$, and a second coiled spring 22$^e$ is connected to the forwardly extending arm 19 and to the arcuate arm 22$^a$, as clearly shown in Figs. 3 and 4 of the drawing. The springs 22$^b$ and 22$^e$ are provided for facilitating the movement of the bars 19 into the position illustrated in Fig. 4, upon the depression of the outer end of the lever 22$^b$. A lug 22$^f$ is formed upon the lever 22$^b$ and is provided for engaging the lower end of the angled arm 22' when the wheels 15 are held in ground engaging position, and a second lug 22$^g$ is also carried by the lever for engagement with the depending arm of the angled arm 22' when the wheels 15 are out of a ground engaging position, as shown in Fig. 4. A stop pin 22$^h$ is carried by the casing 22 for limiting the outward movement of the pivoted lever 22$^b$. A flat spring 22$^k$ is connected to the lever 22$^b$ and has one end inserted into the coiled spring 22$^d$. The spring 22$^k$ is provided for facilitating the operation of the pivoted lever 22$^b$.

The top 22$^m$ of the casing 22 is provided with openings 22$^n$ through which the bar 19 may force snow in case the casing becomes filled with snow.

The lever 22$^b$ is provided for controlling the locking of the rods 19 so that when it is desired to support the weight of the carriage 5 by the runners, the lever 22 is operated which releases the locking structure and allows the weight of the carriage to force the runners downwardly, which move the connecting rods 19 outwardly at angles, with respect to each other, as clearly shown in Fig. 2 of the drawings. This allows pivotal movement of the arcuate levers 16 and 17, under which movement the wheels 15 move upwardly within the substantially inverted U-shaped portions 12 and 14, so that the runner structure 1 will rest upon the surface over which the carriage is traveling, and support the weight of the carriage.

Suitable braces, indicated at 23, 24 and 25 are provided, for supporting the bar 7 in proper spaced relation with respect to the runner 1, and these braces are shaped so as to provide the greatest supporting strength, for their size and also so as to add to the artistic appearance of the runner structure, certain of the braces being curved or curled as shown at 26. A brace 27 is attached to the front curved end 3, of the runner, and it is substantially S-shaped, being secured to the curl or spiral 6 of the upper end of the front curved portion of the runner 3, to the forward side of the front U-shaped portion 12 and to the upper surface of the curved portion 3, at the commencement or lowermost portion of the curvature thereof as clearly shown in Figs. 1 and 2 of the drawings. This substantially S-shaped blade 27 braces the construction of the front end of the runner, and also adds to the artistic appearance of the same.

The safety stop structure 21 has an angled plate 28 attached thereto, the horizontal portion of which projects outwardly beyond the edge of the runner 1 and the bar 7 so that the person pushing the carriage may place their foot upon the horizontal portion and press downwardly thereon for moving the rods 19 into horizontal positions, and the wheels 15 into load supporting position. When it is desired to convert the baby carriage into a sleigh or sled, pressure is applied, by the operator's foot upon the lever 22$^b$ which releases the locking mechanism and allows the rods 19 to move, as previously specified.

In reducing the invention to practice, certain minor features of construction, combination and arrangement of parts may necessitate alterations to which the patentee is entitled provided such alterations are comprehended within the scope of what is claimed.

What is claimed is:—

In a device as set forth, a runner, means for connecting said runner to a baby carriage, said runner being constructed of bar iron and bent intermediate its ends to form a forwardly positioned substantially inverted U-shaped portion and a rearwardly positioned substantially inverted U-shaped portion, a pair of arcuate levers pivotally carried by said runner structure and having their lower ends extending into said inverted U-shaped portions, wheels rotatably carried by the lower ends of said arcuate levers and positioned within said inverted U-shaped members, connecting rods connected to the upper ends of said arcuate levers, and a safety lock structure connected to the inner ends of said connecting rods and adapted for holding said connecting rods against accidental movement for holding said wheels in a load supporting position.

In testimony whereof I affix my signature in presence of two witnesses.

ADAM TAMOL.

Witnesses:
FRANK RUSZKIEWICZ.
ALIK GIRSKI.